(12) United States Patent
Cardone et al.

(10) Patent No.: US 9,783,079 B2
(45) Date of Patent: Oct. 10, 2017

(54) FLOOR TILE SYSTEM FOR MOUNTING VEHICLE SEATS AND METHODS FOR MOUNTING VEHICLE SEATS

(71) Applicant: Freedman Seating Company, Chicago, IL (US)

(72) Inventors: Samuel P. Cardone, Chicago, IL (US); Matthew C. Kerr, Chicago, IL (US)

(73) Assignee: Freedman Seating Company, Chicago, IL (US)

( * ) Notice: Subject to any disclaimer, the term of this patent is extended or adjusted under 35 U.S.C. 154(b) by 0 days.

(21) Appl. No.: 15/467,561

(22) Filed: Mar. 23, 2017

(65) Prior Publication Data

US 2017/0190266 A1  Jul. 6, 2017

Related U.S. Application Data

(62) Division of application No. 14/724,441, filed on May 28, 2015, now Pat. No. 9,637,026.

(51) Int. Cl.
| | |
|---|---|
| *B60N 2/015* | (2006.01) |
| *B62D 25/20* | (2006.01) |
| *B62D 65/14* | (2006.01) |

(52) U.S. Cl.
CPC .......... *B60N 2/015* (2013.01); *B62D 25/2054* (2013.01); *B62D 65/14* (2013.01)

(58) Field of Classification Search
CPC .... B60N 2/015; B62D 25/2009; B62D 27/02; B62D 27/065; B62D 25/2054

(Continued)

(56) References Cited

U.S. PATENT DOCUMENTS

| | | |
|---|---|---|
| 2,121,269 A | 6/1938 | Sisson |
| 2,169,712 A | 8/1939 | Sisson |

(Continued)

FOREIGN PATENT DOCUMENTS

| | | |
|---|---|---|
| DE | 202011051401 U1 | 1/2012 |
| EP | 1028885 B8 | 8/2000 |

(Continued)

OTHER PUBLICATIONS

AMF Bruns of America, SmartFloor system, http://www.amfbrunamerica.com/products/smartfloor/

(Continued)

*Primary Examiner* — Joseph D Pape
(74) *Attorney, Agent, or Firm* — Greenberg Traurig, LLP (57) ABSTRACT

A mounting tile for mounting a vehicle seat to a vehicle floor comprises at least two tubular members having a rectangular cross-sectional shape and a U-shaped channel having apertures that may include weld nuts for receiving fastener elements protruding from the bottom of the vehicle seat structure. A method for mounting a vehicle seat using the mounting tile includes affixing angle iron to the side edges of the floor, affixing a layer of metal plating on top of the angle iron, affixing one or more mounting tiles to the metal plating, positioning filler material between the one or more mounting tiles, positioning a floor covering over the mounting tiles and filler material, aligning the fastener elements of the vehicle seat structure with apertures in the mounting tile, and attaching the fastener elements and the seat to the mounting tile.

8 Claims, 10 Drawing Sheets

(58) Field of Classification Search
USPC .................................. 296/65.03; 248/503.1
See application file for complete search history.

(56) References Cited

U.S. PATENT DOCUMENTS

| | | | |
|---|---|---|---|
| 2,180,502 A | | 11/1939 | Bonsall |
| 2,607,301 A | | 8/1952 | Lundvall |
| 2,669,193 A | | 2/1954 | Osborn |
| 2,675,767 A | | 4/1954 | Davle |
| 2,869,920 A | | 1/1959 | Torbin |
| 3,092,220 A | | 6/1963 | Black |
| 3,269,072 A | | 8/1966 | Black |
| 3,392,954 A | | 7/1968 | Malitte |
| 3,399,636 A | | 9/1968 | Krug |
| 3,652,050 A | | 3/1972 | Marrujo et al. |
| 3,877,671 A | | 4/1975 | Underwood et al. |
| 4,091,743 A | | 5/1978 | Lemon |
| 4,631,891 A | | 12/1986 | Donavich |
| 5,848,775 A | | 12/1998 | Isomura et al. |
| 5,961,088 A | | 10/1999 | Chabanne et al. |
| 6,145,910 A | * | 11/2000 | Baldas ............... B60N 2/01583 248/503.1 |
| 6,595,142 B2 | | 7/2003 | Christensen |
| 7,506,855 B2 | | 3/2009 | Frantz et al. |
| 7,566,086 B2 | * | 7/2009 | Gray .................. H04L 12/2856 296/65.03 |
| 7,762,603 B2 | * | 7/2010 | Hyde .................... B60N 2/015 248/503.1 |

FOREIGN PATENT DOCUMENTS

| | | |
|---|---|---|
| EP | 2641777 A2 | 9/2013 |
| EP | 2641817 A2 | 9/2013 |
| WO | 2006/048632 A1 | 5/2006 |

OTHER PUBLICATIONS

Fenton Mobility Products, AbiliTrax floor system, http://abilitrax.com/abilitrax-flooring-options.
AbiliTrax Modular Flooring Platform, Brochure, 1 Page.
Handicare International, Handi Floor system, http://www.handicare.com/en/products/auto-produts/auto-products/m1-vehicle-floor/handi-floor-m1m2-aluminium-floor/c-226/c-17879/p-7075.

* cited by examiner

FLOOR TILE SYSTEM FOR MOUNTING VEHICLE SEATS AND METHODS FOR MOUNTING VEHICLE SEATS

RELATED APPLICATION INFORMATION

This application is a divisional application of U.S. patent application Ser. No. 14/724,441, filed May 28, 2015, the entire disclosure of which is incorporated herein by reference.

FIELD OF THE DISCLOSURE

The present invention relates generally to a mounting tile system for mounting vehicle seats to the floor of a vehicle, to enable a customized fixed configuration or one-time reconfiguration of the arrangement of seats in the vehicle, as well as to methods for mounting vehicle seats using the mounting tile apparatus.

BACKGROUND OF RELATED ART

Small delivery trucks and other commercial vehicles and vans are sold by the original equipment manufacturer (OEM) with completed vehicle floors, sometimes having pre-installed seats. However, certain vehicle owners desire to customize their vehicle and configure or reconfigure the seating arrangement therein for specific purposes. For example, one vehicle owner may wish to configure the seats in a vehicle, such as a van, to enable the van to safely transport both passengers and cargo. In another example, a vehicle owner may wish to remove the original seats and reconfigure the arrangement of seats to enable the vehicle to safely transport a passenger confined to a mobility device, such as a wheelchair or motorized scooter.

A key consideration for vehicle conversion is that vehicle seats must meet the National Highway Traffic Safety Administration's Federal Motor Vehicle Safety Standards (FMVSS) and Regulations. According to the National Highway Traffic Safety Administration, the FMVSS relevant to seating systems establishes requirements for seats, attachment assemblies and installation, to minimize the chances of failure due to forces acting on seats in the case of vehicle impact. As such, in any vehicle conversion in which seats are installed or removed and re-configured, the seats must meet the requirements set by the FMVSS.

Figure 1:
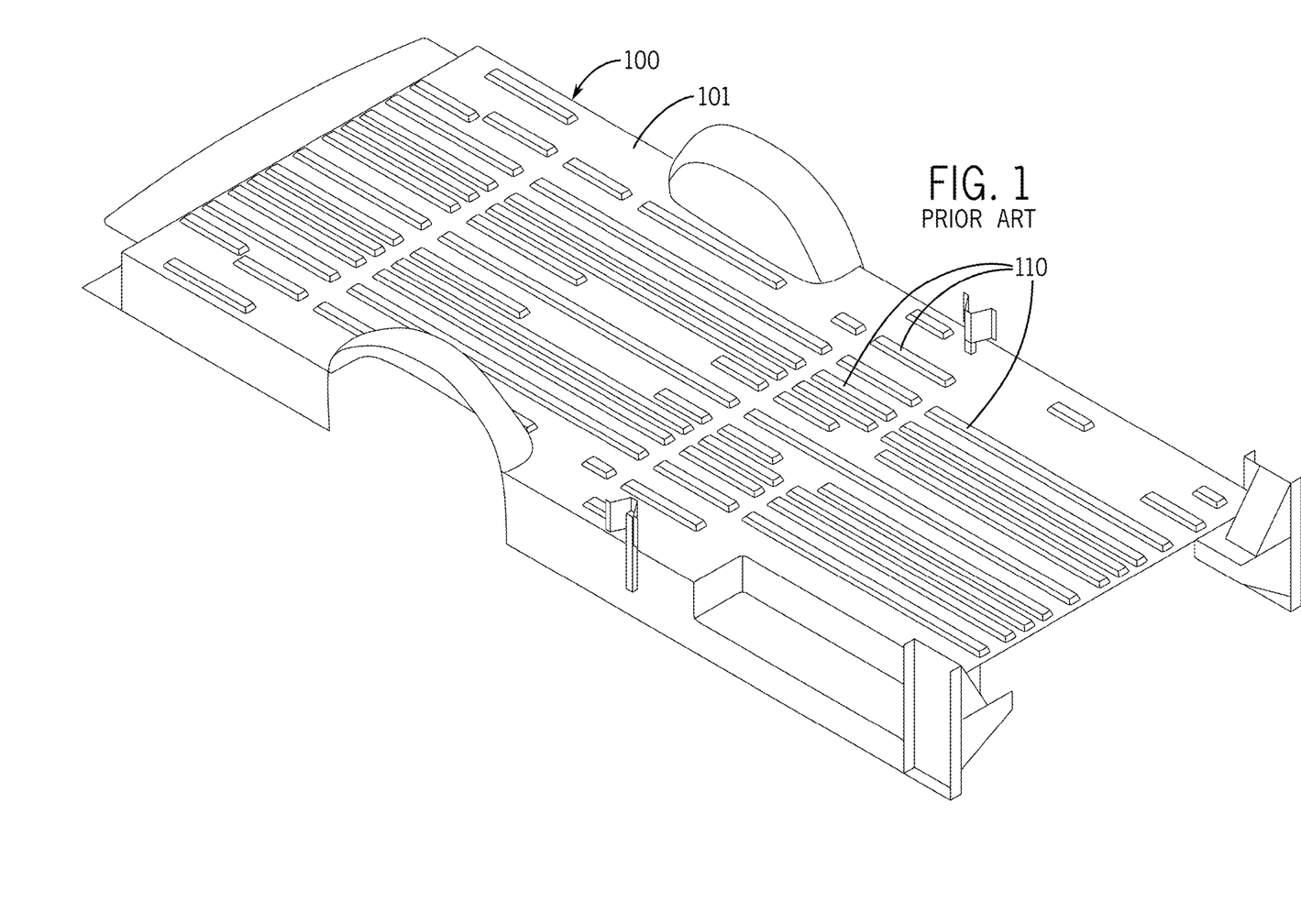
FIG. 1 is a partial perspective view of a prior art OEM floor of a vehicle depicting the ridges integrally formed in (molded or stamped into) the OEM floor.

To reconfigure a vehicle's seating arrangement, it is known in the vehicle conversion business to remove the various layers of flooring installed by the original equipment manufacturer down to the vehicle's true "floor," which typically comprises an uneven metallic surface, referred to herein as "the OEM floor," as shown at reference numeral 101 in FIG. 1. At that point, the vehicle converter can rebuild various layers on top of OEM floor 101 to enable the mounting of seats in the new configuration.

In one example, it is known that the vehicle floor atop the OEM floor can be replaced, in part, with a series of tracks traveling parallel to the longitudinal axis of the vehicle, wherein the tracks are capable of receiving and securing fastener elements protruding from the bottom of the replacement seats. Using these tracks, a vehicle owner can restrainably move and relocate an installed seat forwards or backwards, parallel to the longitudinal axis of the vehicle, to enable the seats to be securely positioned closer or farther to the front of the vehicle, typically, in full compliance with FMVSS. Such track assemblies provide a specific benefit to the vehicle owner: the ability to move the seats forward or backward, or side-to-side, from one point in the track to another point, as desired, to reconfigure the seating arrangement quickly and easily, without the aid of a conversion technician. However, the flexibility provided by these track assemblies also comes with certain drawbacks. For example, the track assemblies are expensive and complicated to install—and these drawbacks only need be endured if the vehicle owner requires that the vehicle seat configuration remain flexible and repositionable without taking the vehicle out of service. For vehicle owners who prefer a "permanent" customized seating configuration (which can only be reconfigured by a vehicle conversion technician), these drawbacks can be avoided by utilizing the disclosures of the present invention.

SUMMARY OF THE INVENTION

In one preferred embodiment of the present invention, a mounting tile for mounting a vehicle seat structure to a vehicle floor comprises (1) a first continuous tubular member with a substantially rectangular cross sectional shape, having a substantially flat top portion and a flat bottom portion, and a first end opposite a second end, the first continuous tubular member also having a first longitudinal side and a second longitudinal side opposite the first longitudinal side; (2) a second continuous tubular member with a substantially rectangular cross sectional shape, a substantially flat top portion and a flat bottom portion, and a first end opposite a second end, the second continuous tubular member also having a first longitudinal side and a second longitudinal side opposite the first longitudinal side; and (3) a U-shaped channel having a substantially flat top portion, a first longitudinal side and a second longitudinal side opposite the first longitudinal side, and a first end opposite a second end. In this embodiment, the second longitudinal side of the first tubular member is affixed to the first longitudinal side of the U-shaped channel and the second longitudinal side of the U-shaped channel is affixed to the first longitudinal side of the second tubular member. The top portion of the U-shaped channel has at least two apertures for cooperating with fastener elements in the vehicle seat structure, and the top portion of the U-shaped channel is substantially co-planar with the substantially flat top portions of each of the first and second continuous tubular members.

In another preferred embodiment of the present invention, the first and second continuous tubular members are each affixed to the U-shaped channel along their respective first and second longitudinal sides through a longitudinal weld.

In these preferred embodiments of the present invention, at least one of the at least two apertures in the top portion of the U-shaped channel includes a weld nut positioned immediately below and in alignment with the aperture.

In a further preferred embodiment of the present invention, at least one of the first and second ends of the first and second continuous tubular members and the U-shaped channel are aligned, and the invention also includes at least one end plate affixed to the respective ends of the first continuous tubular member, the second continuous tubular member and said U-shaped channel.

In this preferred embodiment of the present invention, the at least one end plate is affixed to the first and second continuous tubular members and the U-shaped channel collectively through welding.

In yet another preferred embodiment of the present invention, the length, width and height of the first and second continuous tubular members are substantially equal.

In this preferred embodiment of the present invention, the length and width of the U-shaped channel is substantially identical to the length and width of the first and second continuous tubular members.

In another preferred embodiment of the present invention, a mounting tile for mounting a vehicle seat structure to a vehicle floor comprises (1) a first continuous tubular member with a substantially rectangular cross sectional shape, having a substantially flat top portion and a flat bottom portion, and a first end opposite a second end, the first continuous tubular member also having a first longitudinal side and a second longitudinal side opposite the first longitudinal side; (2) a second continuous tubular member with a substantially rectangular cross sectional shape, a substantially flat top portion and a flat bottom portion, and a first end opposite a second end, the second continuous tubular member also having a first longitudinal side and a second longitudinal side opposite the first longitudinal side; (3) a third continuous tubular member with a substantially rectangular cross sectional shape, a substantially flat top portion and a flat bottom portion, and a first end opposite a second end, the third continuous tubular member also having a first longitudinal side and a second longitudinal side opposite said first longitudinal side; (4) a fourth continuous tubular member with a substantially rectangular cross sectional shape, a substantially flat top portion and a flat bottom portion, and a first end opposite a second end, the fourth continuous tubular member also having a first longitudinal side and a second longitudinal side opposite said first longitudinal side; (5) a first U-shaped channel having a substantially flat top portion, a first longitudinal side and a second longitudinal side opposite the first longitudinal side, and a first end opposite a second end; (6) a second U-shaped channel having a substantially flat top portion, a first longitudinal side and a second longitudinal side opposite said first longitudinal side, and a first end opposite a second end; and (7) a spaced gap between the second and third continuous tubular members, in which a bracket element with a substantially flat top portion is positioned.

In this embodiment, the second longitudinal side of the first tubular member is affixed to the first longitudinal side of the first U-shaped channel, and the second longitudinal side of the first U-shaped channel is affixed to the first longitudinal side of the second tubular member. Similarly, the second longitudinal side of the second tubular member is affixed to the first longitudinal side of the bracket element within the spaced gap, and the second longitudinal side of the bracket element within the spaced gap is affixed to the first longitudinal side of the third tubular member. Further, the second longitudinal side of the third tubular member is affixed to the first longitudinal side of the second U-shaped channel, and the second longitudinal side of the second U-shaped channel is affixed to the first longitudinal side of the fourth tubular member. The top portion of the first and second U-shaped channels has at least two apertures for cooperating with fastener elements in the vehicle seat structure, and the top portions of the first and second U-shaped channels are substantially co-planar with the substantially flat top portion of the bracket element and the substantially flat top portions of each of the first, second, third and fourth continuous tubular members.

In another preferred embodiment of the invention, the continuous tubular members are affixed to the U-shaped channels along their respective first and second longitudinal sides through a longitudinal weld.

In yet another preferred embodiment of the invention, at least one of the at least two apertures in the top portion of the U-shaped channel includes a weld nut positioned immediately below and in alignment with the aperture.

In a different preferred embodiment of the present invention, at least one of the first and second ends of the continuous tubular members, the spaced gap and the U-shaped channels are aligned, and the mounting tile apparatus also includes at least one end plate affixed to the respective ends of the continuous tubular members and the U-shaped channels.

In another preferred embodiment of the invention, the at least one end plate is affixed through welding.

In a different preferred embodiment of the invention, the length, width and height of each of the first, second, third and fourth continuous tubular members are substantially equal.

In yet another preferred embodiment of the invention, the length and width of the first and second U-shaped channels are substantially identical to the length and width, respectively, of the first, second, third and fourth continuous tubular members.

In a different preferred embodiment of the present invention, the bracket element has an aperture that is substantially co-planar with at least one of the apertures in the first and second U-shaped channels.

Another preferred embodiment of the present invention includes a method for mounting a vehicle seat structure to a vehicle floor, where the vehicle seat structure has fastener elements and the vehicle floor has pre-formed ridges within its OEM floor. The method includes the steps of (1) affixing a layer of angle iron to at least the side edges of the OEM floor to a height substantially equal to the height of the pre-formed ridges, to create a substantially level primary surface formed by the pre-formed ridges and the angle iron; (2) affixing a substantially level secondary surface on top of the substantially level primary surface formed by the pre-formed ridges and the angle iron; (3) affixing at least one vehicle seat mounting tile to the substantially level secondary surface, the at least one mounting tile having at least one fastener element positioned therewithin; (4) positioning a filler material on top of the substantially level secondary surface at locations in which no mounting tiles were affixed to the substantially level secondary surface, to create a substantially level tertiary surface formed by the at least one mounting tile and the filler material; (5) positioning a floor covering on top of the substantially level tertiary surface; (6) aligning the fastener elements in the vehicle seat structure with the at least one fastener element in the at least one mounting tile; and (7) attaching the fastener elements in the vehicle seat structure to the at least one fastener element in the mounting tile to restrainably attach the vehicle seat structure in position atop the floor covering.

In one preferred embodiment of this method, each of the affixing steps are accomplished through welding.

In one preferred embodiment of this method, the filler material comprises one or more pieces of wood.

In another preferred embodiment of this method, the height of the filler material is substantially identical to the height of the at least one mounting tile.

In yet another preferred embodiment of this method, the substantially level secondary surface comprises a layer of metal plating.

DETAILED DESCRIPTION

Reference will now be made in detail to the preferred embodiments of the invention, examples of which are illustrated in the accompanying drawings. While the invention will be described in conjunction with the preferred embodiments, the invention is intended to cover alternatives, modifications and equivalents, which may be included within the spirit and scope of the invention as defined by the claims. Furthermore, in the detailed description of the present invention, several specific details are set forth in order to provide a thorough understanding of the present invention. However, one of ordinary skill in the art will appreciate that the present invention may be practiced without these specific details.

Thus, while the invention is susceptible to embodiment in many different forms, the subsequent description of the present disclosure should be considered as an exemplification of the principles of the invention, and should not be limited to the specific embodiments shown and described herewithin.

As noted above, FIG. 1 depicts a portion of an example vehicle floor 100, including OEM floor 101. OEM floor 101 typically includes a series of ridges 110 formed integrally within OEM floor 101. Compared with an entirely flat surface, ridges 110 in OEM floor 101—and the fact that ridges 110 are integrally formed therein—provide additional stability to the floor of a vehicle in case of impact. Still, ridges 110 create an uneven surface, and since the mounting tiles of the present invention require affixation to a flat, stable surface, vehicle conversion technicians must "fill in the gaps" and reinforce the strength of OEM floor 101, as described hereinbelow.

Figure 2A:
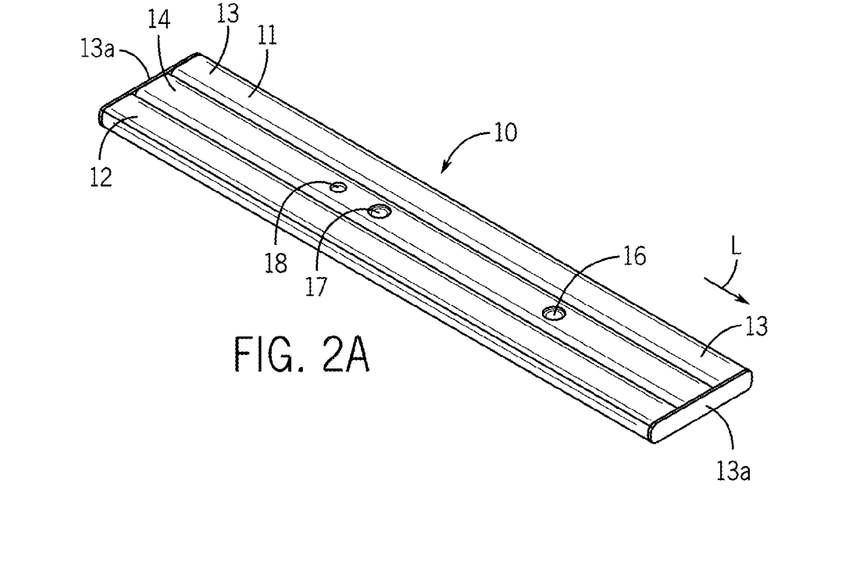
FIG. 2A is a top perspective view of an example mounting tile for permanently mounting a standard vehicle seat within a vehicle according to the present invention.
Figure 2B:
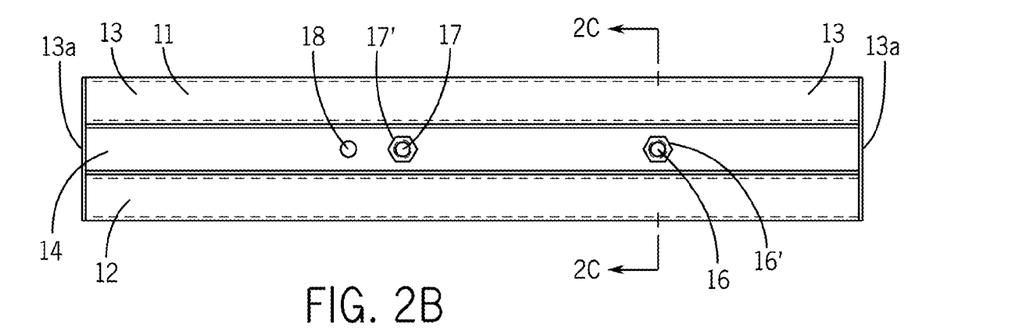
FIG. 2B is a bottom plan view of the mounting tile shown in FIG. 1A.
Figure 2C:
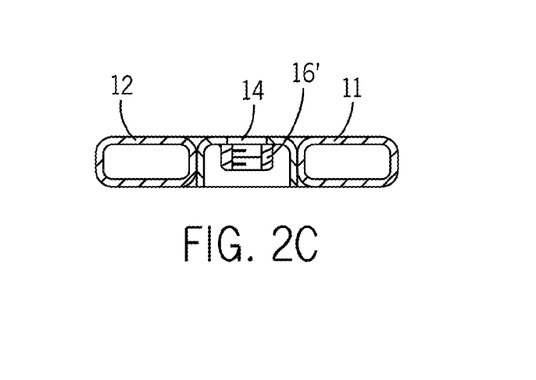
FIG. 2C is an elevated cross-sectional view of the mounting tile shown in FIG. 2B, taken along line 2C-2C, and looking in the direction of the arrows.

Referring now to FIGS. 2A-2C, an example mounting tile 10 according to the present invention is shown. Mounting tile 10 is intended for use in mounting a standard vehicle seat, and comprises first tube 11 and second tube 12, both of which are substantially rectangular in cross-sectional shape. That is, each of first tube 11 and second tube 12 include a flat top portion and a flat bottom portion, a first end opposite a second end, and a first longitudinal side opposite a second longitudinal side. Mounting tile 10 further comprises U-shaped channel 14, which has a flat top portion, a first longitudinal side opposite a second longitudinal side, and a first end opposite a second end. U-shaped channel 14 is positioned in between, and affixed to, first tube 11 and second tube 12 parallel to a common longitudinal axis L. Specifically, a longitudinal side of first tube 11 is attached to a first longitudinal side of U-shaped channel 14, while the second longitudinal side of U-shaped channel 14 is attached to a first longitudinal side of second tube 12. Once first tube 11, second tube 12 and U-shaped channel 14 have been positioned adjacently and affixed to one another as shown in FIG. 2A, end caps 13a are affixed at the respective first and second opposing ends 13 of mounting tile 10.

U-shaped channel 14 comprises apertures 16, 17 and 18 for receiving fastener elements (not shown in FIGS. 2A-2C) which cooperate with a mounting bracket on the bottom of a standard vehicle seat (also not shown in FIGS. 2A-2C). More specifically, apertures 16 and 17 may include weld nuts 16' and 17' for telescopically receiving the fastener elements. Weld nuts 16' and 17' are not strictly necessary; rather, they assist vehicle conversion technicians by acting as a secondary fastener element (to be used with a primary fastener element, such as a bolt, for example). Positioning weld nuts 16' and 17' in alignment with apertures 16 and 17 provides a vehicle conversion technician with greater accessibility to the secondary fastener element, whereas the absence of such weld nuts may require the vehicle conversion technician to position a similar secondary fastener element in a place that is difficult to reach.

Figures 10, 11:
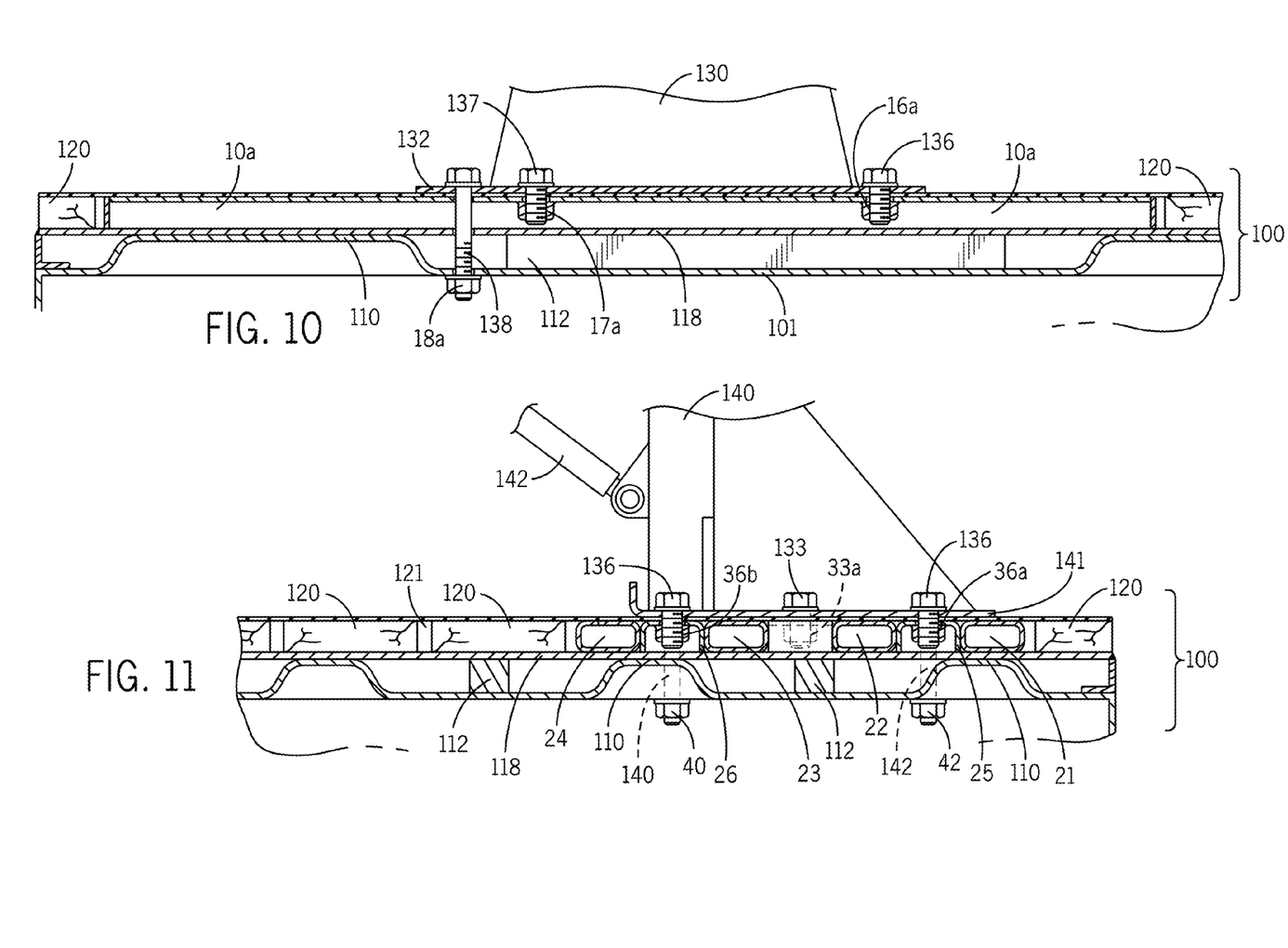
FIG. 10 is an elevated cross-sectional view of mounting tile 10a shown in FIG. 9, taken along line 10-10, and looking in the direction of the arrows, showing the fastener elements cooperating with a standard vehicle seat to affix the vehicle seat to the mounting tile.
FIG. 11 is an elevated cross-sectional view of mounting tie 20a shown in FIG. 9, taken along line 11-11, and looking in the direction of the arrows, showing the fastener elements cooperating with a folding vehicle seat, to affix the vehicle seat to the mounting tile.

Aperture 18 likewise may or may not include a weld nut. In the case where aperture 18 does not include a weld nut, aperture 18 may receive an elongated fastener element, which has a greater length than the fastener elements which cooperate with weld nuts 16' and 17'. The elongated fastener element protrudes downwardly through mounting tile 10 and through OEM floor 101, as shown in FIG. 10 and further described relative to FIG. 10 hereinbelow. The elongated fastener element is then telescopically received beneath OEM floor 101 by a cooperating threaded fastener element. This affixation beneath OEM floor 101 is believed to provide greater stability to mounting tile 10 and any vehicle seat mounted thereon, compared with the shorter fastener element that cooperate with weld nuts 16' and 17'.

Figure 3A:
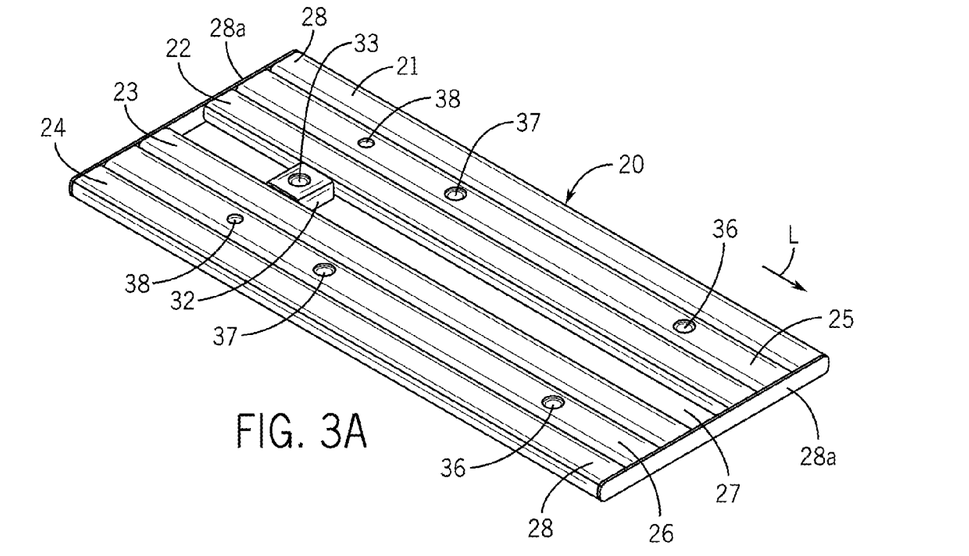
FIG. 3A is a top perspective view of an example mounting tile for permanently mounting a folding vehicle seat according to the present invention.
Figure 3B:
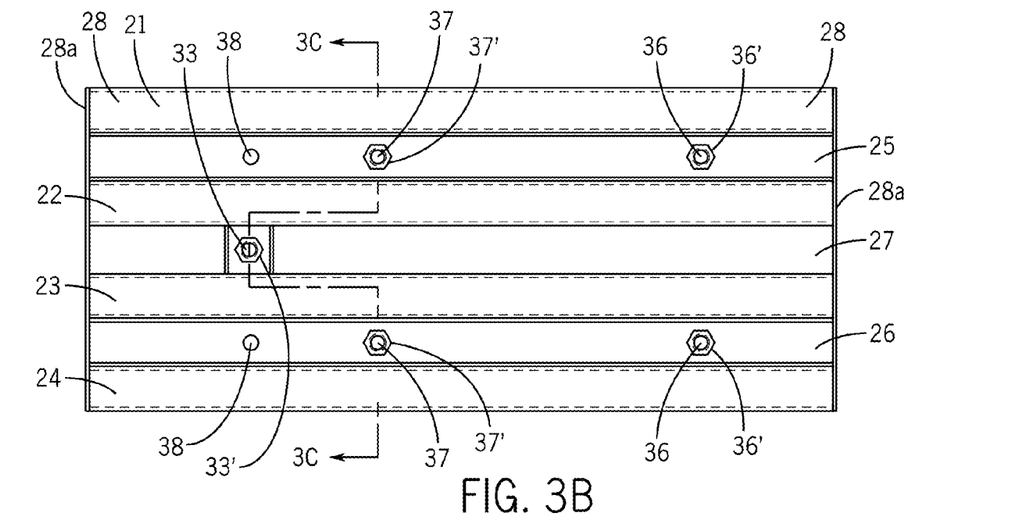
FIG. 3B is a bottom plan view of the mounting tile shown in FIG. 2A.
Figure 3C:
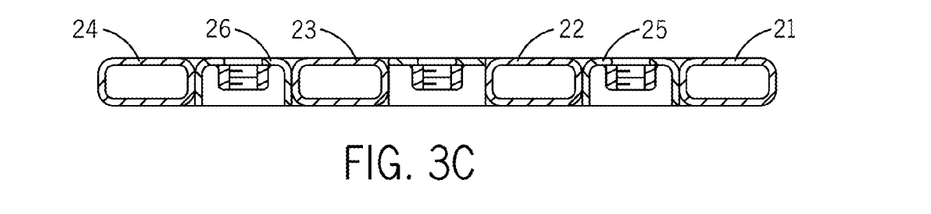
FIG. 3C is an elevated cross-sectional view of the mounting tile shown in FIG. 3B, taken along line 3C-3C, and looking in the direction of the arrows.

Referring now to FIGS. 3A-3C, an example mounting tile 20 according to the present invention is shown. Mounting tile 20 is intended for use in mounting cantilevered vehicle seats that are capable of folding to a stowed position, as shown in FIG. 11 and further described relative to FIG. 11 hereinbelow. In such vehicle seats, the seatback can be folded down on top of the seating portion, and the combined seatback/seating portion can be rotated to a stowed, vertical position. Such vehicle seats may include those sold under the trademark FSC FOLDAWAY®, which trademark is owned and used by Freedman Seating Co. of Chicago, Ill., the assignee of the present invention. Whereas standard vehicle seats may be mounted using more than one mounting tile disclosed herein, such folding seats are cantilevered, and may therefore be mounted using only a single mounting tile, for example, mounting tile 20.

Mounting tile 20 comprises first tube 21, second tube 22, third tube 23 and fourth tube 24—each of which is substantially rectangular in cross-sectional shape. That is, each of first tube 21, second tube 22, third tube 23 and fourth tube 24 include a flat top portion and a flat bottom portion, a first end opposite a second end, and a first longitudinal side opposite a second longitudinal side. Mounting tile 20 further comprises U-shaped channels 25 and 26, each of which has a flat top portion, a first longitudinal side opposite a second longitudinal side, and a first end opposite a second end. U-shaped channel 25 is positioned in between, and affixed to, first tube 21 and second tube 22 parallel to a common longitudinal axis L. Likewise, U-shaped channel 26 is positioned in between, and affixed to, third tube 23 and fourth tube 24 parallel to axis L. More specifically, a longitudinal side of first tube 21 is attached to a first longitudinal side of U-shaped channel 25, while the second longitudinal side of U-shaped channel 25 is attached to a first longitudinal side of second tube 22. The second longitudinal side of second tube 22 is positioned adjacent to spaced gap 27, which is positioned adjacent to a first longitudinal side of third tube 23. Likewise, here, the second longitudinal side of third tube 23 is affixed to a first longitudinal side of U-shaped channel 26, while the second, opposite longitudinal side of U-shaped channel 26 is affixed to a longitudinal side of fourth tube 24. Once first tube 21, second tube 22, third tube 23 and fourth tube 24 have been positioned and affixed to U-shaped channels 25 and 26, and second tube 22 and third tube 23 have been positioned and affixed to bracket 32, as shown in FIG. 3A, end caps 28a are affixed, such as by welding, at the respective first and second opposing ends 28 of mounting tile 20.

As in the case of mounting tile 10, each of U-shaped channels 25 and 26 in this example comprises apertures 36, 37 and 38 for receiving fastener elements (not shown in FIGS. 3A-3C) that protrude from the bottom of vehicle seats. Apertures 36 and 37 may or may not include weld nuts 36' and 37', which provide accessibility for vehicle conversion technicians. Weld nuts 36' and 37' may telescopically receive the fastener elements from a vehicle seat. In addition, spaced gap 27 includes bracket 32 with its own aperture 33, which may include a weld nut 33' for telescopically receiving a fastener element from a vehicle seat. Notably, because spaced gap 27 includes bracket 32 with its own aperture 33, apertures 37 are optional in this example of the present invention, because the three rear-facing apertures 38, 33 may be sufficient on their own to prevent forward movement of the vehicle seat, upon any vehicle impact. As with aperture 16 in mounting tile 10, apertures 38 in mounting tile 20 may or may not include weld nuts.

Apertures 38 may receive an elongated fastener element that also protrudes through a mounting bracket affixed to a vehicle seat. For apertures 38 that do not include weld nuts, the elongated fastener elements may be of a greater length than the fastener elements which cooperate with weld nuts 16' and 17'. The elongated fastener element protrudes downward through mounting tile 20 and through OEM floor 101, as shown in the context of mounting tile 10a in FIG. 10, and further described relative to FIG. 10 hereinbelow. The elongated fastener element is then telescopically received beneath OEM floor 101 by a cooperating threaded fastener element. This affixation beneath OEM floor 101 is believed to provide greater stability to mounting tile 20 and any vehicle seat mounted thereon, compared with the shorter fastener element that cooperate with weld nuts 36' and 37'.

Figure 4:
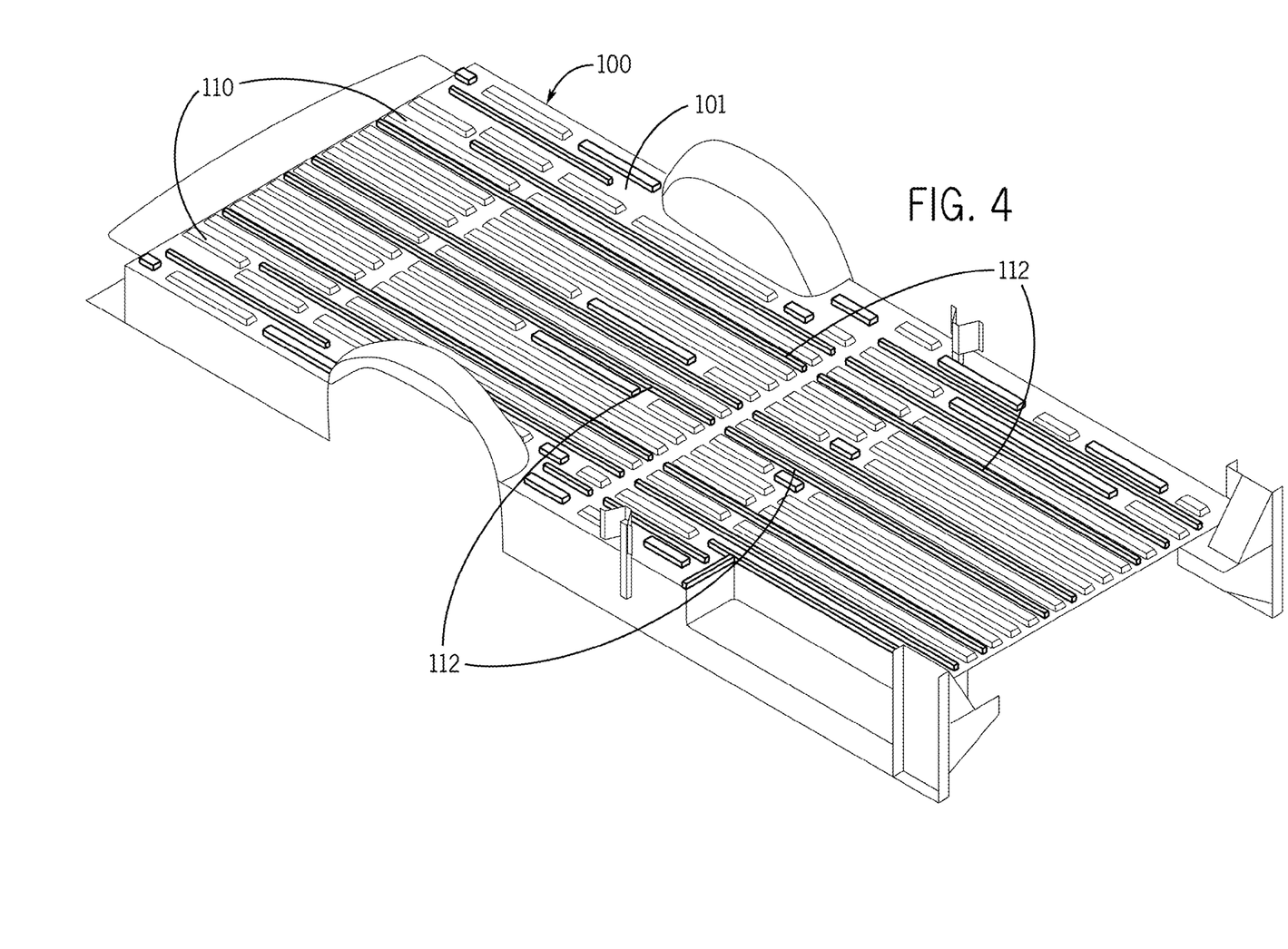
FIG. 4 is a perspective view of the OEM floor of FIG. 1, in which a vehicle conversion technician has elected to affix bar stock in between the pre-formed ridges of the OEM floor.

Referring to FIG. 4, an example vehicle floor 100 is shown, which includes OEM floor 101. One possible first step in the process of installing the example mounting tiles in a vehicle is to affix layers of bar stock 112 in between ridges 110 of OEM floor 101. Preferably, bar stock 112 is of the same height as ridges 110, so as to create a basis for laying and affixing a flat surface, as described hereinbelow. The affixation of bar stock 112 to OEM floor 101 may be by welding, or by any other suitable means known by those of skill in the art to yield permanent affixation. The affixation of bar stock 112 is not necessary to the present invention, but can be used to provide additional stability for vehicle floor 100.

Figure 5:
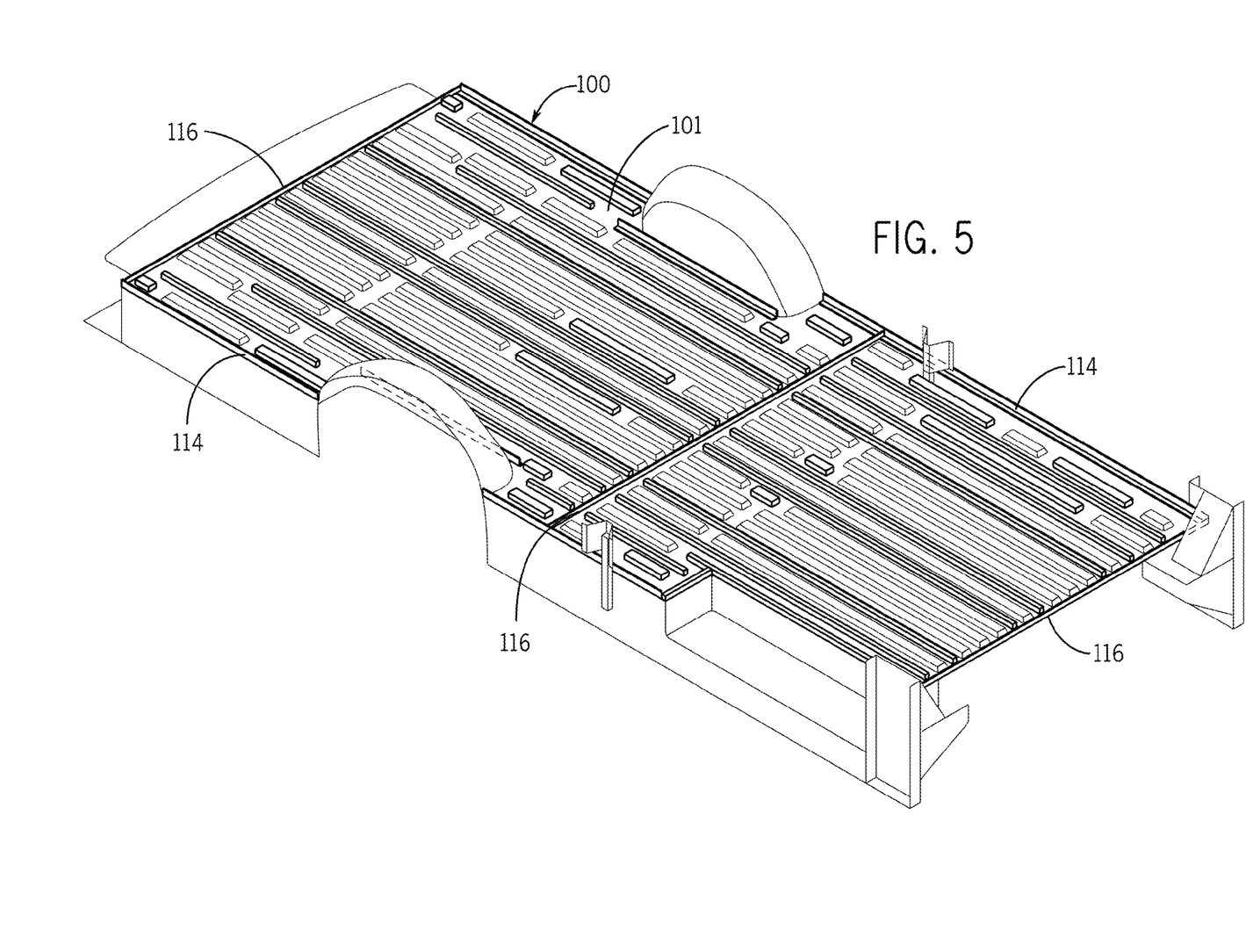
FIG. 5 is a perspective view of the OEM floor of FIG. 4, in which angle iron has been affixed around the sides of the vehicle floor, and support struts have been affixed in the front, middle and rear of the vehicle floor.

Referring to FIG. 5, a layer of angle iron 114 is affixed around the perimeter of OEM floor 101. Angle iron 114 affixes and bonds to both OEM floor 101 and to the walls of the vehicle, thereby reinforcing OEM floor 101 to the vehicle walls, and providing additional stability. Again, the means of affixation may be by welding, or by any other suitable means known by those of skill in the art to yield permanent affixation. Once angle iron 114 has been affixed, support struts 116 are affixed laterally across the vehicle at the vehicle's front, the vehicle's rear and the middle of the vehicle. Support struts 116 further reinforce the stability of OEM floor 101 and the vehicle by connecting the affixed angle iron 114 on opposite sides of the vehicle. Together, the ridges 110, optional bar stock 112, support struts 116 and the (horizontal portion of the) angle iron 114 are at substantially the same height, and thereby form a substantially flat primary surface upon which another layer can be placed.

Figure 6:
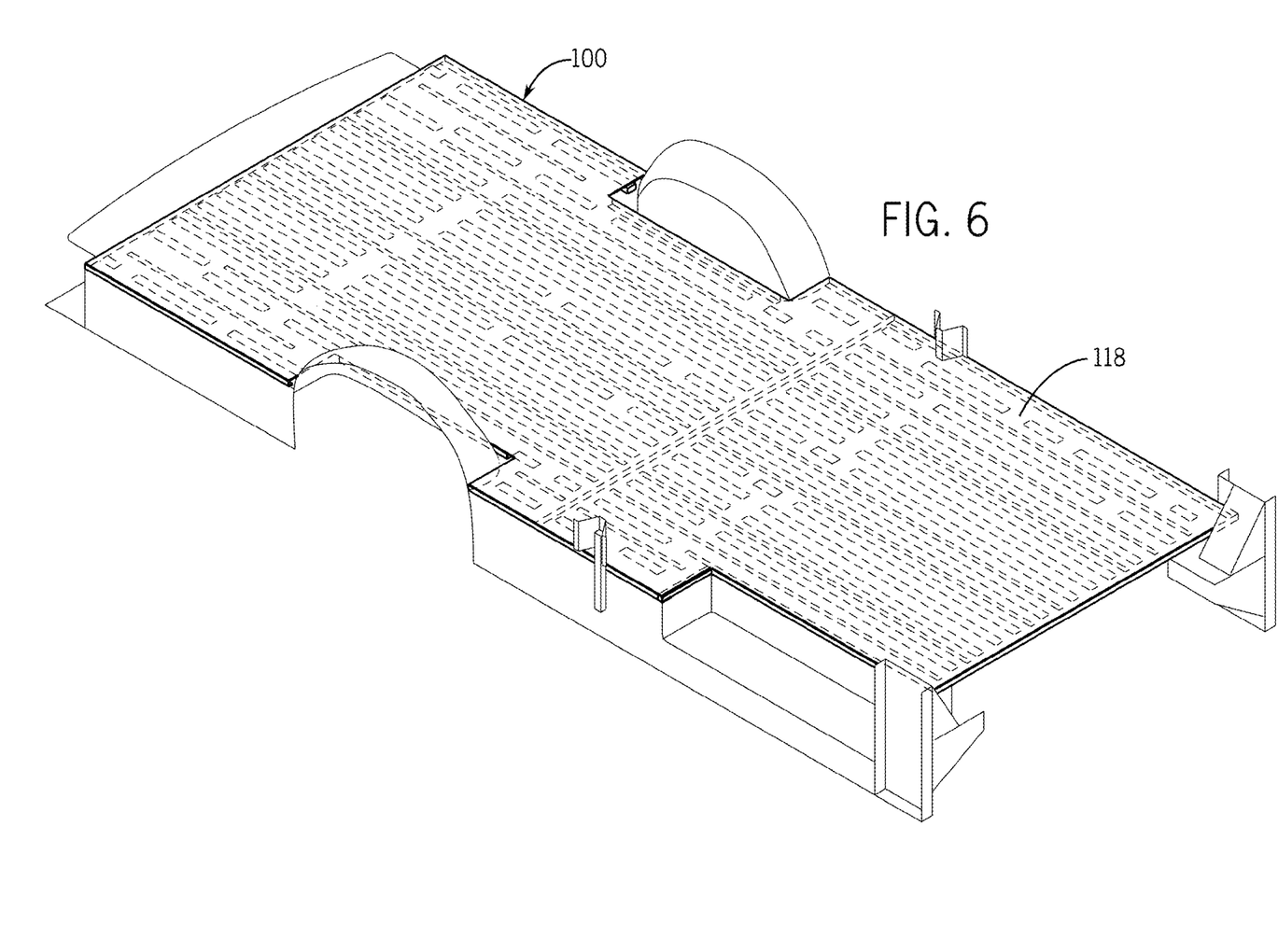
FIG. 6 is a perspective view of the vehicle floor of FIG. 5, in which metal plating has been affixed onto the tops of the angle iron, the optional bar stock and the strut members to create a flat, level surface, upon which the mounting tiles can be affixed.
Figure 7:
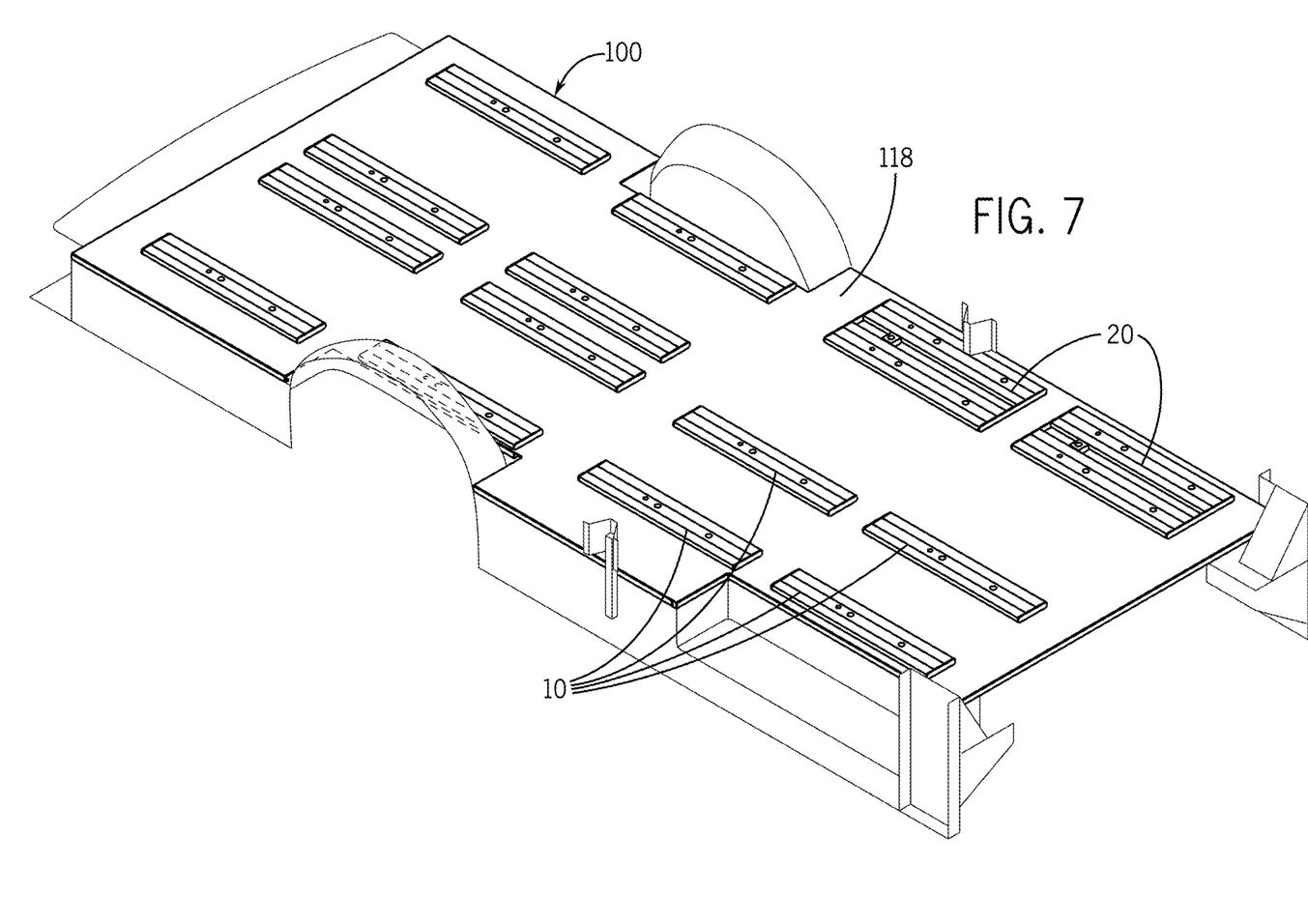
FIG. 7 is a perspective view of the vehicle floor of FIG. 6, in which example mounting tiles have been affixed on top of the metal plating.

With reference to FIG. 6, a layer of metal plating 118, for example, 14 gauge plate, is affixed to the optional pieces of bar stock 112 and to ridges 110 of OEM floor 101 (each shown in phantom) to create a secondary flooring surface. Metal plating 118 creates the secondary surface as a flat surface on which the example mounting tiles can be affixed. FIG. 7 depicts OEM floor 101 with metal plating 118 affixed thereon, together with mounting tiles 10 and 20. The means of affixation of mounting tiles 10 and 20 to metal plating 118 may be by welding, or by any other suitable means known to those of skill in the art to yield permanent affixation.

Figure 8:
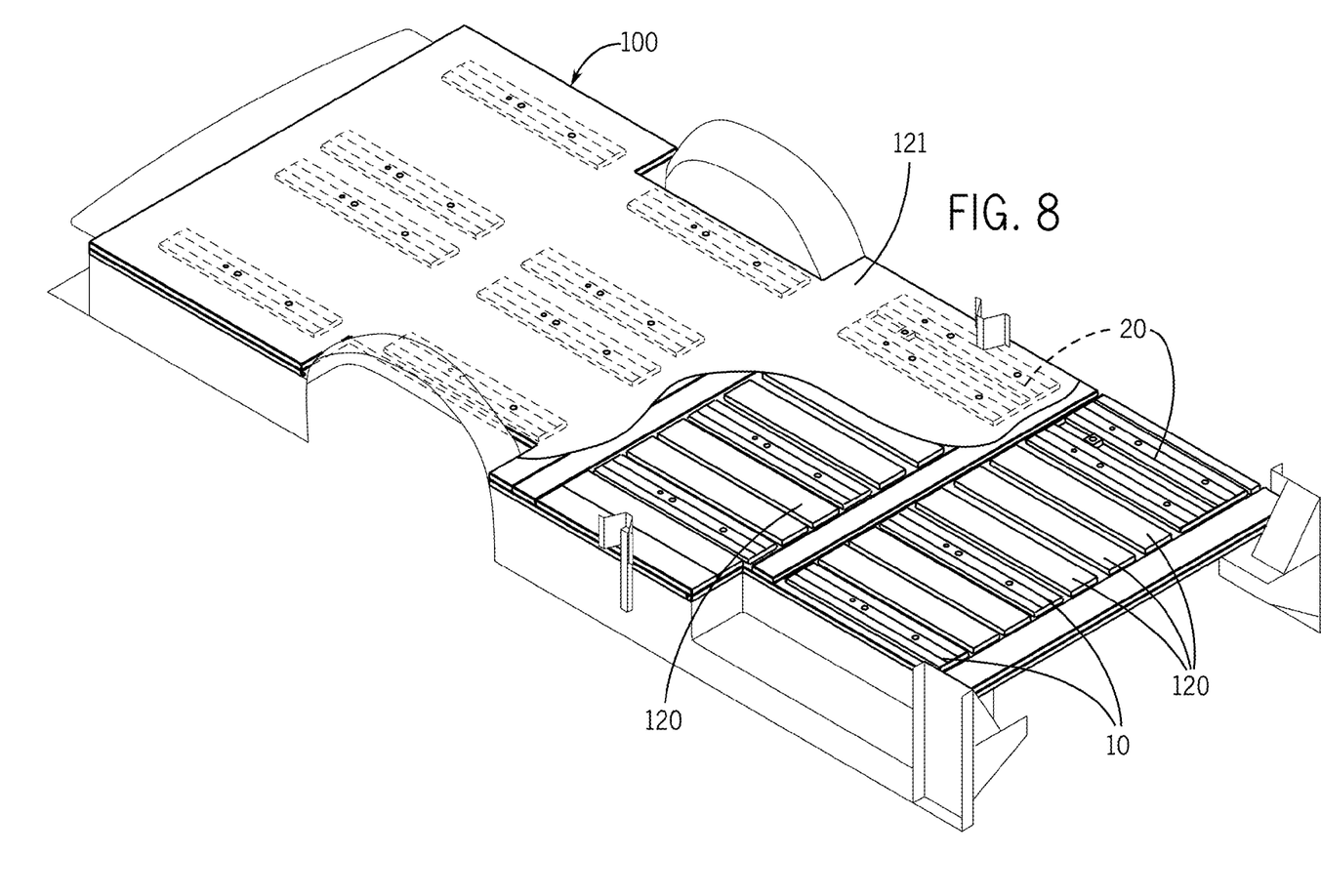
FIG. 8 is a perspective view of the vehicle floor of FIG. 7, in which pieces of filler material have been affixed in between the example mounting tiles, and a partial floor covering has been positioned over the tops of the filler material and mounting tiles.

Referring to FIG. 8, after mounting tiles 10 and/or 20 have been affixed to metal plating 118, pieces of filler material 120 are laid in between mounting tiles 10 and/or 20 for the purpose of again creating a flat, level, temporary tertiary surface. Filler material 120 may be pieces of wood, metal or any other suitable material for filling in the gaps between the mounting tiles. Preferably, the height of filler material 120 is substantially equivalent to the height of mounting tiles 10 and/or 20, to again impart a substantially flat surface to this tertiary level. Finally, a floor covering 121 is laid down on top of the transitional tertiary surface formed by mounting tiles 10 and/or 20 and filler material 120, to create a final flooring surface. Floor covering 121 is the "floor" upon which passengers of the vehicle will walk after the seats have been installed. As such, floor covering 121 can comprise any material known by those of skill in the art to be used for vehicle flooring, such as plastic, wood, vinyl, carpet or a rubberized material.

Figure 9:
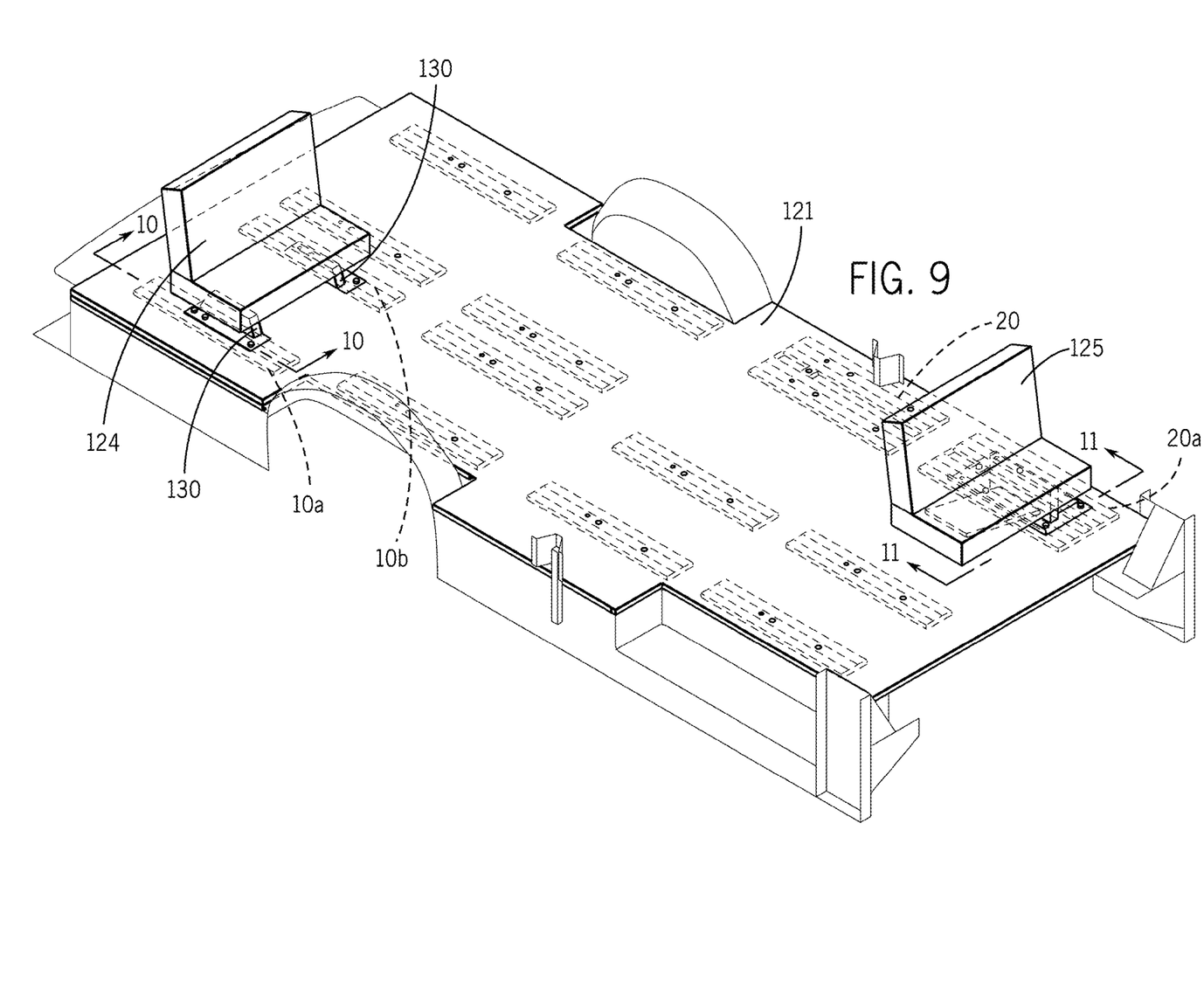
FIG. 9 is a perspective view of the vehicle floor of FIG. 8, in which the installed mounting tiles are visible in phantom through the completed floor covering, and in which a standard vehicle seat has been installed on top of two mounting tiles in the rear of the vehicle.

FIG. 9 depicts the finished floor of the vehicle, including floor covering 121, and mounting tiles 10 and 20 hidden underneath (as shown in phantom). FIG. 9 further depicts standard vehicle seat 124 mounted on top of mounting tiles 10a and 10b, as well as folding vehicle seat 125 mounted on top of mounting tile 20a. The method of affixing standard vehicle seat 124 to mounting tiles 10a and 10b, and of affixing and folding vehicle seat 125 to mounting tile 20a, is further described hereinbelow with respect to FIGS. 10 and 11.

FIG. 10 depicts a cross-sectional view of the completed vehicle floor and, specifically, of the section of vehicle floor 100 on which mounting tile 10a (shown in FIG. 9) is affixed. The bottom-most layer depicted in FIG. 10 is OEM floor 101, which includes ridge 110. Immediately above OEM floor 101 is a piece of optional bar stock 112, which is covered by metal plating 118. Mounting tile 10a is affixed on top of metal plating 118, and the sections behind and in front of mounting tile 10a are filled with filler material 120. Finally, floor covering 121 is laid on top of mounting tile 10a and filler material 120.

Standard vehicle seat 124 (shown in FIG. 9) includes leg element 130, for use with mounting tile 10a, and leg element 131, for use with mounting tile 10b, with leg elements 130, 131 protruding downward from standard vehicle seat 124. Each of leg elements 130, 131 is integrally attached to a mounting bracket, for example, mounting bracket 132, which may be of substantially the same surface area as mounting tile 10a. Leg elements 130, 131 are of a substantially rectangular shape, and remain open on one side to enable the attachment of fastener elements 136, 137 and 138. Fastener element 136 is telescopically received by and cooperates with weld nut 16a, which is affixed to aperture 16 in mounting tile 10a. Likewise, fastener element 137 is telescopically received by and cooperates with weld nut 17a, which is affixed to aperture 17 in mounting tile 10a. As shown in FIG. 10, unlike fastener elements 136 and 137, which do not protrude beyond the layer of metal plating 118, fastener element 138 protrudes downward through mounting tile 10a, through metal plating 118, and through OEM floor 101, where it is telescopically received by and cooperates with nut 18a. Since leg element 132 is the rear-most leg element of standard vehicle seat 124, this affixation of leg element 132 through the bottom of OEM floor 101 creates additional stability for restraining standard vehicle seat 124 in its position, in the case of a forward-moving vehicle impact. Alternatively, aperture 18 of mounting tile 10a may also include weld nut 18', in which case fastener element 138 does not protrude downwardly through the entirety of mounting tile 10a.

FIG. 11 depicts a cross-sectional view of the completed vehicle floor and, specifically, of the section of vehicle floor 100 on which mounting tile 20a (shown in FIG. 9) is affixed. The bottom-most layer depicted in FIG. 10 is OEM floor 101, which includes ridge 110. Immediately above OEM floor 101 are pieces of optional bar stock 112, which are covered by metal plating 118. Mounting tile 20a is affixed on top of metal plating 118, and the sections to the sides of mounting tile 20a are filled with filler material 120. Finally, floor covering 121 is laid on top of mounting tile 20a and filler material 120.

Folding vehicle seat 125 (shown in FIG. 9) is cantilevered, and thus includes only a single leg element 140, for use with mounting tile 20a. Leg element 140 protrudes downward from folding vehicle seat 125, and supports the weight of folding vehicle seat 125 via cantilever 142. The bottom of leg element 140 is integrally attached to mounting bracket 141, which may be of substantially the same surface area as mounting tile 20a. As shown in FIG. 11, fastener elements 136 are telescopically received by and cooperate with weld nuts 36a, 36b, which are affixed to apertures 36 in mounting tile 20a. Likewise, fastener element 133 is telescopically received by and cooperates with weld nut 33a, which is affixed to aperture 33 in mounting tile 20a. While not shown in FIG. 11, additional fastener elements are telescopically received by and cooperate with weld nuts 37' (shown in FIG. 3B). Further, as described above with respect to FIG. 10, to provide additional stability in the case of a forward-moving vehicle impact, additional fastener elements 140, 142 may protrude through apertures 38 (also shown in FIG. 3B), downward through mounting tile 20a, through metal plating 118, and through OEM floor 101, where they are telescopically received by and cooperate with nuts 40, 42 underneath OEM floor 101. Alternatively, apertures 38 of mounting tile 20a may each also include a weld nut, in which case the fastener elements 140, 142 cooperate with the weld nuts, and do not protrude downwardly past metal plating 118.

The foregoing description and drawings merely explain and illustrate the invention, and the invention is not so limited, as those skilled in the art who have the disclosure before them will be able to make modifications and variations therein without departing from the scope of the invention.

What is claimed is:

1. A mounting tile apparatus for mounting a vehicle seat structure to a vehicle floor, comprising:

a first continuous tubular member having a substantially rectangular cross sectional shape, a substantially flat top portion and a substantially flat bottom portion, and a first end opposite a second end, said first continuous tubular member also having a first longitudinal side and a second longitudinal side opposite said first longitudinal side;

a second continuous tubular member having a substantially rectangular cross sectional shape, a substantially flat top portion and a substantially flat bottom portion, and a first end opposite a second end, said second continuous tubular member also having a first longitudinal side and a second longitudinal side opposite said first longitudinal side;

a third continuous tubular member having a substantially rectangular cross sectional shape, a substantially flat top portion and a substantially flat bottom portion, and a first end opposite a second end, said third continuous tubular member also having a first longitudinal side and a second longitudinal side opposite said first longitudinal side;

a fourth continuous tubular member having a substantially rectangular cross sectional shape, a substantially flat top portion and a substantially flat bottom portion, and a first end opposite a second end, said fourth continuous tubular member also having a first longitudinal side and a second longitudinal side opposite said first longitudinal side;

a first inverted U-shaped channel having a substantially flat top portion, a first longitudinal side and a second longitudinal side opposite said first longitudinal side, and a first end opposite a second end; and a second inverted U-shaped channel having a substantially flat top portion, a first longitudinal side and a second longitudinal side opposite said first longitudinal side, and a first end opposite a second end;

said second longitudinal side of said first tubular member being affixed to said first longitudinal side of said first U-shaped channel, and said second longitudinal side of said first U-shaped channel being affixed to said first longitudinal side of said second tubular member, said second longitudinal side of said second tubular member being positioned adjacent a first side of a spaced gap, in which said bracket element is positioned, the second side of said spaced gap being positioned adjacent the first longitudinal side of said third continuous tubular member, with a bracket element spanning the width of said spaced gap to connect the second longitudinal side of said second continuous tubular member to the first longitudinal side of said third continuous tubular member, said second longitudinal side of said third tubular member being affixed to said first longitudinal side of said second U-shaped channel, and said second longitudinal side of said second U-shaped channel being affixed to said first longitudinal side of said fourth tubular member, said top portion of said first and second U-shaped channels including at least two apertures for cooperating with fastener elements in said vehicle seat structure, and said top portions of said first and second U-shaped channels being substantially co-planar with the substantially flat top portion of said bracket element and the substantially flat top portions of each of said first, second, third and fourth continuous tubular members.

2. The mounting tile apparatus of claim 1, in which said continuous tubular members are affixed to said U-shaped channels along their respective first and second longitudinal sides through a longitudinal weld.

3. The mounting tile apparatus of claim 1, in which at least one of said at least two apertures in the top portion of said U-shaped channel includes a weld nut positioned immediately below and in alignment with said aperture.

4. The mounting tile apparatus of claim 1, in which at least one of the first and second ends of said continuous tubular members, said spaced gap and said U-shaped channels are aligned, said mounting tile apparatus further comprising at least one end plate affixed to the respective ends of said continuous tubular members and said U-shaped channels.

5. The mounting tile apparatus of claim 4, in which said at least one end plate is affixed through welding.

6. The mounting tile apparatus of claim 1, in which the length, width and height of each of said first, second, third and fourth continuous tubular members are substantially equal.

7. The mounting tile apparatus of claim 6, in which the length and width of said first and second U-shaped channels are substantially identical to the length and width, respectively, of the first, second, third and fourth continuous tubular members.

8. The mounting tile apparatus of claim 1, in which said bracket element includes an aperture that is substantially co-planar with at least one of said apertures in said first and second U-shaped channels.

* * * * *